(12) United States Patent
Jakobsen

(10) Patent No.: US 7,938,019 B2
(45) Date of Patent: May 10, 2011

(54) SEALED ELECTRODE ASSEMBLY FOR FLUID MEASUREMENTS

(75) Inventor: Johnny Jakobsen, Bergen (NO)

(73) Assignee: Roxar Flow Measurement AS, Bergen (NO)

( * ) Notice: Subject to any disclaimer, the term of this patent is extended or adjusted under 35 U.S.C. 154(b) by 119 days.

(21) Appl. No.: 12/438,016

(22) PCT Filed: Sep. 3, 2007

(86) PCT No.: PCT/NO2007/000309
§ 371 (c)(1),
(2), (4) Date: Feb. 19, 2009

(87) PCT Pub. No.: WO2008/030101
PCT Pub. Date: Mar. 13, 2008

(65) Prior Publication Data
US 2010/0162827 A1    Jul. 1, 2010

(30) Foreign Application Priority Data

Sep. 5, 2006    (NO) .................................... 20063976

(51) Int. Cl.
    *G01F 1/58*    (2006.01)
(52) U.S. Cl. ................................................... 73/861.12
(58) Field of Classification Search .................. None
    See application file for complete search history.

(56) References Cited

U.S. PATENT DOCUMENTS

| | | | |
|---|---|---|---|
| 2,560,209 A | 7/1951 | Borell et al. | |
| 2,949,551 A | 8/1960 | Sturgeon | |
| 3,158,682 A | 11/1964 | Goellner | |
| 3,171,990 A * | 3/1965 | Bennett | 310/11 |
| 3,213,685 A | 10/1965 | Mannherz et al. | |
| 4,279,166 A | 7/1981 | Gryn et al. | |
| 4,388,834 A * | 6/1983 | Schmoock | 73/861.12 |
| 4,565,619 A * | 1/1986 | Gardner et al. | 204/400 |
| 4,773,275 A * | 9/1988 | Kalinoski | 73/861.12 |
| 4,899,593 A | 2/1990 | Inami et al. | |
| 5,269,191 A | 12/1993 | Wada | |

(Continued)

FOREIGN PATENT DOCUMENTS

JP    2004-333406    11/2004

(Continued)

OTHER PUBLICATIONS

International Search Report for PCT/NO2007/000309 mailed Jan. 7, 2008.

(Continued)

*Primary Examiner* — Harshad Patel
(74) *Attorney, Agent, or Firm* — Nixon & Vanderhye PC

(57) ABSTRACT

A sealed electrode assembly for fluid measurements in a pressurized pipe having a wall, for providing contact between an electrode in contact with the fluid and the outside. The assembly includes a conductive bolt extending from the electrode and through the wall, a lining in the pipe having an opening for the bolt and insulating the electrode from the wall, a sealing ring fitted around the bolt, a mantel surrounding the bolt having a recess partially accepting the sealing ring and provided a pressure on the sealing ring when pressed into the recess, and a tightening structure on the outside of the wall for applying a pressure forcing the electrode toward the wall and thus a pressure between the lining, sealing ring and mantel.

10 Claims, 2 Drawing Sheets

U.S. PATENT DOCUMENTS

| | | | |
|---|---|---|---|
| 5,994,907 | A | 11/1999 | Mulder et al. |
| 6,178,826 | B1 | 1/2001 | Graf et al. |
| 2006/0150746 | A1 | 7/2006 | Keese et al. |

FOREIGN PATENT DOCUMENTS

| | | |
|---|---|---|
| WO | WO 2006/063929 | 6/2006 |

OTHER PUBLICATIONS

International Preliminary Report on Patentability for PCT/NO2007/000309 dated Dec. 5, 2008.

Norwegian Search Report for NO 20073976 dated Apr. 4, 2007.

* cited by examiner

SEALED ELECTRODE ASSEMBLY FOR FLUID MEASUREMENTS

This application is the U.S. national phase of International Application No. PCT/NO2007/000309, filed 3 Sep. 2007, which designated the U.S. and claims priority to Norway Application No. 2006 3976, filed 5 Sep. 2006, the entire contents of each of which are hereby incorporated by reference.

The present invention relates to a sealed electrode assembly for fluid measurements in a pressurized pipe or container having a wall, for providing contact between an electrode in contact with the fluid and the outside, said assembly comprising a conductive bolt extending from said electrode and through the wall.

Measuring of electric characteristics of fluid flows represent a known solution for monitoring and analyzing multifluid flows, e.g. for finding the oil/water/gas ratio, alone or in combination with other measuring techniques, such as gamma and pressure measurements in the flow. One example showing such a measuring system is illustrated in the international patent application No PCT/NO2006/000218, including four or more electrodes distributed along the inner circumference of the pipe. The flows are often under high pressure and thus the connection means for coupling electronics to the flow is complicated.

Because of the high pressures known electrode systems for measuring fluid properties in multiphase oil/gas/water flows require large and complex units for avoiding leaks, short circuiting between the electrodes and problems related to the high pressures inside the pipe. The present units comprise electrodes extending through thick inner linings of PEEK (polyetheretherketone) or similar materials for insulating the electrodes relative to each other. The PEEK lining being provided with sealing rings on the ends being coupled to the continuing steel pipe material. In order to avoid water intrusion into the electronic circuitry oils chambers are used, which represents a cumbersome solution during maintenance or other work performed on the measuring unit. The PEEK lining is expensive and the overall solution is subject to leaks and other problems related to the flow conditions and pressure, as well as complicating the work in maintenance or reparations of the electrodes because of the positions of the sealings etc.

Thus it is an object to the present invention to provide a compact electrode configuration for measuring in high pressure environments, e.g. up to 1000 bars, especially in pipelines, also avoiding the thick lining and providing an improved protection against leaks in the electrode area. These objects are obtained using an electrode assembly as stated above and characterized as specified in the accompanying claims.

The present invention thus provides a means for obtaining a compact electrode configuration in a pipe while also making it possible to position a number of electrodes around the inner circumference of the pipe, thus providing complex measurements of the flow.

The invention also provide a solution which allows simple mounting procedures as the sealing is mainly obtained in the same operation as the fastening of the electrodes.

The above mentioned objects of this invention are obtained as described in the accompanying claims.

The invention is described more in detail below with reference to the accompanying drawings, which illustrate the invention by way of examples.

Figure 1:
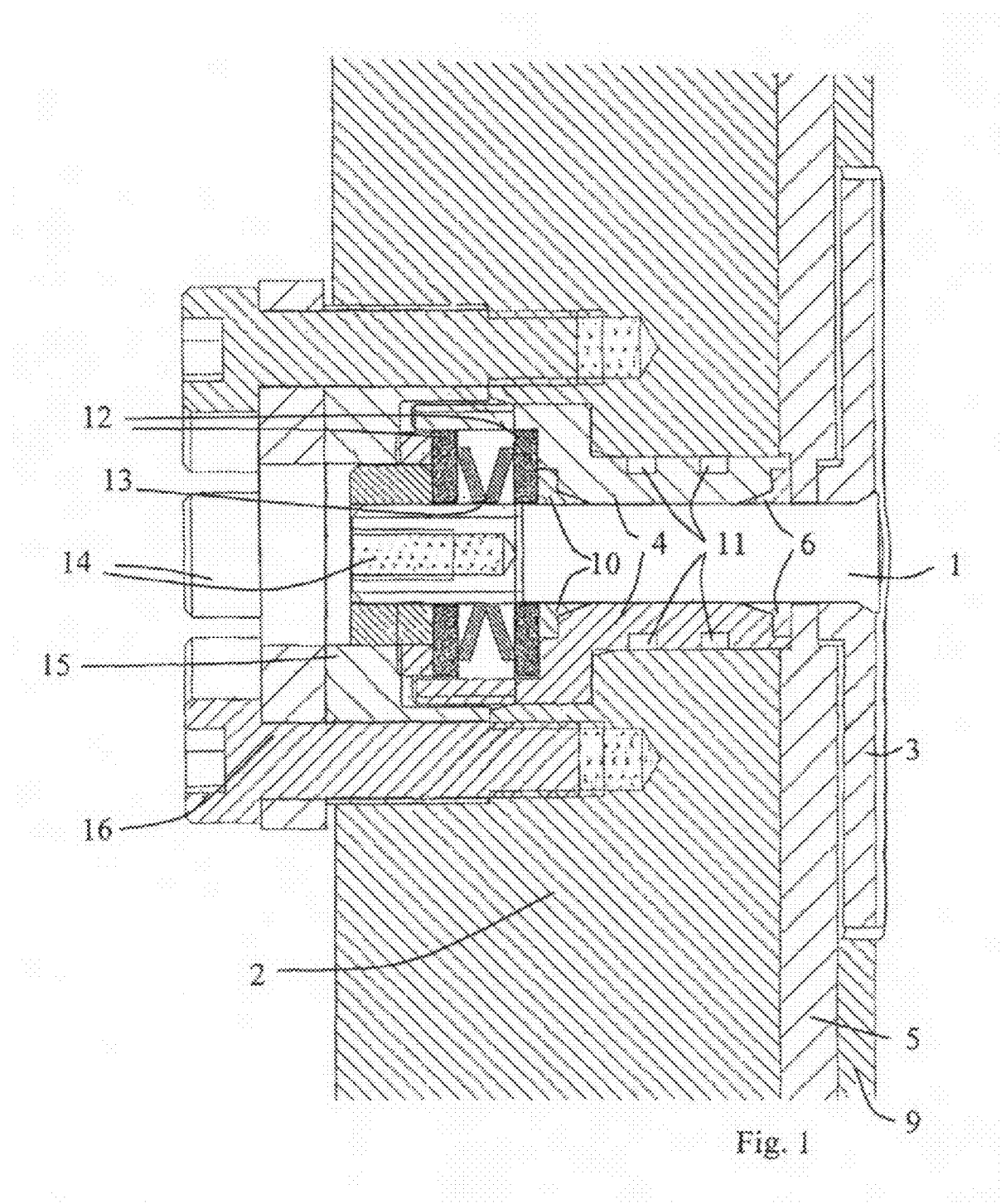
FIG. 1 shows a cross section of the assembly according to the invention

FIG. 1 shows a bolt 1 extending through a pipe wall 2. The bolt 1 is coupled to an electrode 3 on the inner surface of the pipe wall 2, with an insulating material 5 positioned between the electrode 3 and the pipe 2. A casing or mantel 4, preferably made from an insulating material, is also positioned between the bolt 1 and the pipe wall 2. In the meeting area between the insulating material/liner 5, the casing 4 and the bolt 1 a cavity is provided in the casing 4 having an at least partially frustoconical shape pointing outward. In this cavity a sealing ring 6 is provided having a slightly larger cross section than the cavity.

When the bolt 1 is mounted a pressure is applied pulling the inner end of the bolt 1 with the corresponding electrode 3 towards the pipe wall 2. This provides a pressure on the insulating liner 5 which in turn applies a pressure on the sealing ring 6, which when pressed into the frustoconical shaped cavity, is also pressed inward against the bolt 1. Thus a sealing is obtained between the casing 4 and the bolt 1. Also, in the illustrated example the casing 4 comprises a surface which is pressed against the insulating material 5.

In the preferred embodiment the casing 4 is also made from an insulating material, e.g. PEEK or Teflon, but this may be optional if the bolt 1 itself comprises an insulating outer surface. In such cases the casing 4 may be constituted by a part of the pipe wall 2. In the shown example the casing 4 is cylindrical and is provided with sealing rings, e.g. standard O-rings or other standard sealings 11, in the interacting surface between it and the pipe wall 2, so as to avoid leaks.

According to the preferred embodiment of the invention the insulating materials are chosen so as to provide PEEK to Teflon interfaces in as many positions as possible, so as to utilize the good sealing capabilities of this combination. Thus, if the liner 5 is made from Teflon the sealing ring 6 is made from PEEK and the casing 4 is made from Teflon. The opposite situation may also be used.

The reason why Teflon and especially PEEK is considered to be suitable in the insulating materials is the chemical stability in the flow environment. In addition Teflon shows good sealing capability, while PEEK withstands higher temperatures (up to 140°) without getting soft and is mechanically durable. Both materials are water repelling.

As is evident in the drawings, the illustrated embodiment includes an inner liner 9, preferably also made from an insulating material. As PEEK is the material most suitable to withstand the pressure and chemical conditions in the pipe it is preferably chosen.

The inner liner 9 will then provide an essentially continuous surface with the electrodes 3 so that any disturbance to the flow conditions is reduced to a minimum. The liners 5, 9 may also be made from the same material, e.g. PEEK.

In FIG. 1 an optional second cavity with sealing ring 10 is provided in the opposite end of the bolt 1, close to the fastening means 14, 15 positioned on the outer side of the pipe wall. In this end the bolt 1 comprises a ring assembly 12, 13 pressing the second sealing ring 10 in the second cavity, thus providing an additional seal between the bolt 1 and the casing 4.

In order to optimize the pressure and pressure distribution the ring assembly 12, 13 is constituted by two circular discs 12 surrounding the bolt 1 and separated by a spring 13. In the illustrated example, the fastening means 14, 15 comprises a screw 14 and a member 15. Thus, when the bolt 1 is fastened, in the illustrated example with screw 14 into the outer end of the bolt 1, member 15 is pushed against spring 13. The spring 13 is pressed together and applies a force between the ring 12 and the casing 4, pressing the sealing rings 6, 10 into the cavities with a predetermined force, and thus providing a seal between the bolt 1 and the casing 4. The sealing assembly is held in place by additional fastening means 16.

For easing this procedure and the alignment of the electrodes 3 the bolt 1 has an inner head section adapted for connection with the electrode plates 3 having a spherical shape adapted to be pressed against a corresponding conical surface on the electrode plates 3. This way the electrode plate 3 may not have an orientation completely perpendicular to the bolt 1 axis, while the contact and a sealing effect between the two is still maintained.

In the drawings the electrodes 3 are shown as flat, plate shaped metal electrodes. These are suitable for the use discussed in the abovementioned international patent application No PCT/NO2006/000218, and will in that case constitute approximately a comparable part of the circumference with the insulating material. Other electrodes may, however, be contemplated, from circular rings to coaxial solutions where the bolt 1 constitutes a coaxial conductor, e.g. for microwave conduction, and the electrode plate 3 constitutes a shield or simply a ring for applying the force on the sealing liner 5, sealing ring 6 and casing 4. In some cases the electrode 3 and bolt 1 may also be made in one part.

The fastening of the bolt 1 on the outside may be performed in any way suitable for the specific situation and will not be discussed here. This also relates to the means for coupling the bolt 1 to measuring instruments etc.

Using the electrode assembly according to the invention makes it possible to provide an electrode unit being easily installed and maintained. It can be made as a pipe section wherein the liner 5 is simply slipped into the pipe. The bolt or bolts 1 are inserted through the electrodes 3, liner 5 and holes, through the pipe wall 2, and preferably the casings 4 to be fastened from the outside with sufficient force to provide sealing between the liner 5, sealing ring 6 and casing 4, as well as the corresponding sealing in the outer portion of the bolt 1.

Figure 2:
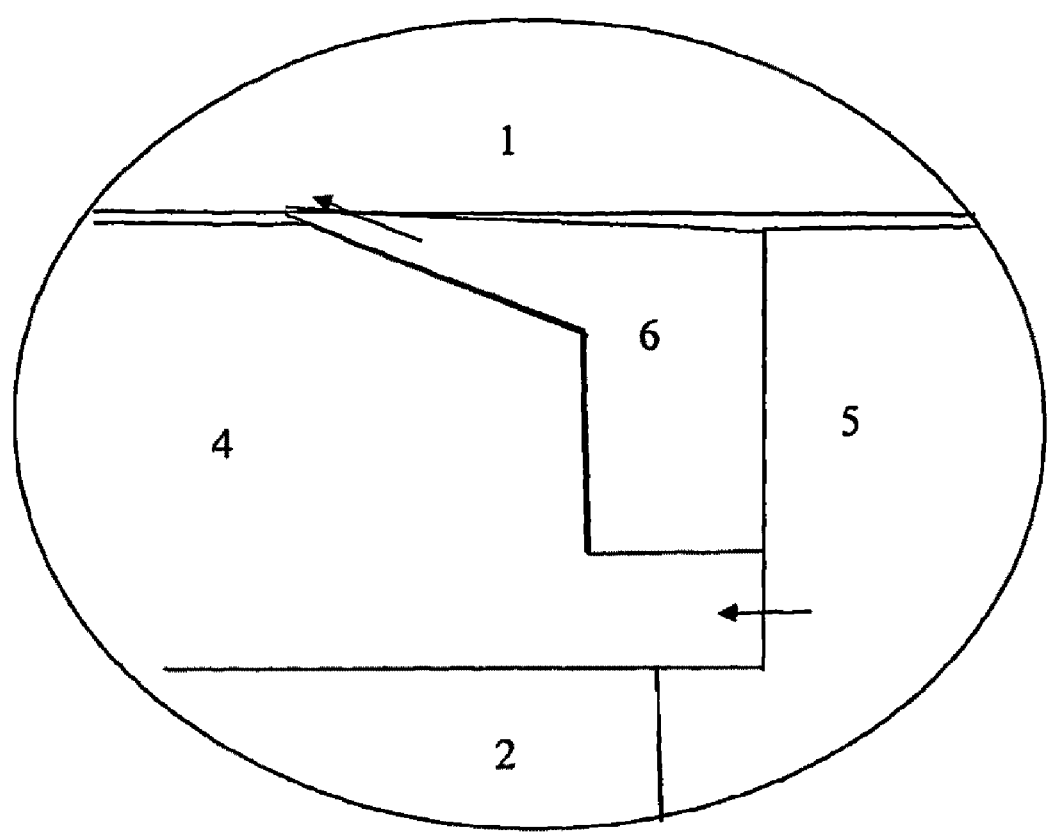
FIG. 2 shows an enlarged detail of the solution illustrated in FIG. 1.

In FIG. 2 a preferred embodiment of the sealing rings 6, 10 is illustrated wherein the sealing ring 6 according to the invention is preferably provided with a conical part and being slightly larger that the cavity in the axial direction. Thus, when the first liner 5 is pressed against the sealing ring 6 and casing/mantel 4 the sealing ring 6 is lead as illustrated with an arrow, by the conical shape in the radial direction toward the bolt 1, thus providing a sealing effect. The sealing ring 6 may also be an ordinary O-ring or other standard sealings positioned in a wedge shaped cavity providing the same effect, but possibly at the cost of some pressure resistance.

The above description of the present invention is pressure tested according to ASTM B31.3 and designed for 10000 PSI pressure (approximately 690 bar) and hydrostatic tested at 15000 PSI (approximately 1035 bar). By making some adjustments it is also possible to use the present invention for measuring in higher pressure environments up to 15000PSI (approximately 1035 bar). Referring to FIG. 1 the sealed electrode assembly may be modified to withstand 15000 PSI pressure (approximately 1035 bar) by splitting the mantel 4 in the area between the two sealing rings 11 so that it has an inclined surface between the pipe wall 2 and the bolt 1. Thus, a mechanical sealing, preferably made of PEEK, is pressed against the wall 2 and bolt 1 when the nut 15 is fastened. The remaining parts of the assembly are as previously described. This modified assembly is hydrostatic tested at 22500 PSI (approximately 1552 bar).

To summarize the invention relates to a sealed electrode assembly for fluid measurements in a pressurized pipe or container having a wall 2, for providing contact between an electrode 3 in contact with the fluid and the outside, said assembly comprising a conductive bolt 1 extending from said electrode 3 and through the wall 2. The assembly comprises a first lining 5 in said pipe or container of a resilient and sealing material having an opening for said bolt 1 and insulating the electrode 3 from the wall 2, a first sealing ring 6 fitted around the bolt 1, said lining 5 being between the first sealing ring 6 and the electrode 3, and a mantel 4 surrounding said bolt 1 having an essentially conical first recess partially accepting said first sealing ring 6 and provided a radial pressure on said first sealing ring 6 when pressed into said recess. Thus a sealing effect is obtained between the bolt 1, the mantel or casing 4, the first lining 5 and the sealing ring 6 when a pressure is provided by tightening means 13, 14, 15 provided on the outside of said wall 2 being adapted to apply a pressure forcing the electrode 3 toward the wall 2 and thus a pressure between said lining 5, said sealing ring 6 and said mantel 4.

The lining 5, sealing ring 6 and mantel 4 is preferably made from a material being resistant against chemical exposure, mechanical wear and temperature variations, e.g. so called PEEK or Teflon. Especially at least one pair of mutually sealing parts is made from different material e.g. constituting a PEEK against Teflon constellation, for providing an especially efficient sealing.

The assembly may comprise an additional lining 9 inside said first lining 5, said first additional lining 9 being constituted by a material being resistant against chemical exposure, mechanical wear and temperature variations, e.g. PEEK.

According to a preferred embodiment of the sealing ring 6 has a frustoconical shape adapted to be complemented by said conical shape on said mantel 4, but being slightly oversized on the longitudinal direction of the bolt 1 so as to be pushed with its most narrow part into the radial direction against the bolt 1, so as to provide an efficient sealing effect.

A second sealing ring 10 may also be positioned between said tightening means and said mantel 4, said mantel 4 having an essentially conical second recess partially accepting said second sealing ring 10 and provided a radial pressure on said second sealing ring 10 when pressed into said recess. This way a redundancy is obtained making the assembly less sensitive to errors in the faults occurring by the inner sealing ring 10.

As is shown in the drawings the tightening means may comprise a threaded end on said bolt 1 and a nut 15 fitted on said bolt 14, and a spring 13 positioned between the nut and said mantel 4. The electrode 3 and the bolt 1 can be in one part.

The inner part of the bolt 1 is introduced through a hole in said electrode 3 with a bolt 1 head defining a stop point in said hole, and the surface on the bolt 1 interacting with the electrode 3 has a partially spherical shape and the related surface on the electrode 3 has a conical shape partially corresponding to the spherical shape of the bolt 1 head.

The mantel 4 is cylindrical and is sealed against the adjacent wall with sealing rings 6, 10.

The invention claimed is:

1. Sealed electrode assembly for fluid measurements in a pressurized pipe or container having a wall, for providing contact between an electrode in contact with the fluid and the outside, said assembly comprising a conductive bolt extending from said electrode and through the wall, and further comprising:
 a first lining in said pipe or container of a resilient and sealing material having an opening for said bolt and insulating the electrode from the wall,
 a first sealing ring fitted around the bolt, said first lining being between the first sealing ring and the electrode, a mantel surrounding said bolt having an essentially conical first recess partially accepting said first sealing ring and provided a radial pressure on said first sealing ring when pressed into said recess, and a tightening means on the outside of said wall for applying a pressure forcing the electrode toward the wall and thus a pressure between said first lining, said first sealing ring and said mantel, at least two of: said first lining, said first sealing ring, and said mantel are made from materials being resistant against chemical exposure, mechanical wear and temperature variations, said at least two of: said first lining, said first sealing ring and said mantel constituting a pair of mutually sealing parts that are made from different materials.

2. Assembly according to claim 1, wherein one part of said pair of mutually sealing parts is made from PEEK and the other part of said pair of mutually sealing parts is made from Teflon.

3. Assembly according to claim 1, comprising a first additional lining inside said first lining, said first additional lining being constituted by a material being resistant against chemical exposure, mechanical wear and temperature variations.

4. Assembly according to claim 1, wherein said sealing ring has a frustoconical shape adapted to be complemented by said conical shape on said mantel.

5. Assembly according to claim 1, comprising a second sealing ring positioned between said tightening means and said mantel, said mantel having an essentially conical second recess partially accepting said second sealing ring and provided a radial pressure on said second sealing ring when pressed into said recess.

6. Assembly according to claim 1, wherein said tightening means comprises a threaded end on said bolt and a nut fitted on said bolt, and a spring positioned between the nut and said mantel.

7. Assembly according to claim 1, wherein the electrode and bolt is in one part.

8. Assembly according to claim 1, wherein the bolt is introduced through a hole in said electrode with a bolt head defining a stop point in said hole, and the surface on the bolt interacting with the electrode has a partially spherical shape and the related surface on the electrode has a conical shape partially corresponding to the spherical shape of the bolt head.

9. Assembly according to claim 1, wherein the mantel is cylindrical and is sealed against the wall with sealing rings.

10. Assembly according to claim 1, wherein the assembly further comprises a first fastening means on the outer side of the wall and a second fastening means adapted to provide additional tightening of the assembly.

* * * * *